(12) United States Patent
Tsukioka et al.

(10) Patent No.: US 11,868,630 B2
(45) Date of Patent: Jan. 9, 2024

(54) METHOD FOR CHANGING CONFIGURATION OF STORAGE SYSTEM AND STORAGE SYSTEM

(71) Applicant: Hitachi, Ltd., Tokyo (JP)

(72) Inventors: Jun Tsukioka, Tokyo (JP); Yutaka Oshima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 234 days.

(21) Appl. No.: 17/475,112

(22) Filed: Sep. 14, 2021

(65) Prior Publication Data
US 2022/0350510 A1 Nov. 3, 2022

(30) Foreign Application Priority Data

Apr. 30, 2021 (JP) ................................. 2021-077095

(51) Int. Cl.
*G06F 12/00* (2006.01)
*G06F 3/06* (2006.01)

(52) U.S. Cl.
CPC .......... *G06F 3/0632* (2013.01); *G06F 3/0619* (2013.01); *G06F 3/0683* (2013.01)

(58) Field of Classification Search
CPC ..... G06F 3/0619; G06F 3/0659; G06F 3/0689
USPC ....................................................... 711/170
See application file for complete search history.

(56) References Cited

U.S. PATENT DOCUMENTS

| | | | |
|---|---|---|---|
| 9,430,114 B1* | 8/2016 | Dingman | G06F 16/25 |
| 9,639,589 B1* | 5/2017 | Theimer | G06F 21/00 |
| 10,083,100 B1* | 9/2018 | Agetsuma | G06F 11/2094 |
| 2006/0253496 A1* | 11/2006 | Hunter | G06F 16/80 |
| 2009/0327343 A1* | 12/2009 | McCormack | G06F 16/258 |
| 2016/0371145 A1* | 12/2016 | Akutsu | H03M 13/2906 |
| 2017/0293697 A1* | 10/2017 | Youshi | G06F 16/84 |
| 2019/0243553 A1 | 8/2019 | Yamamoto et al. | |
| 2019/0310925 A1* | 10/2019 | Yoshida | G06F 3/065 |
| 2020/0210291 A1* | 7/2020 | Yamamoto | G06F 11/1076 |
| 2021/0255805 A1* | 8/2021 | Harata | H04L 12/403 |
| 2022/0350510 A1* | 11/2022 | Tsukioka | G06F 11/2089 |

FOREIGN PATENT DOCUMENTS

WO 2018179073 A1 10/2018

\* cited by examiner

*Primary Examiner* — Mohamed M Gebril
(74) *Attorney, Agent, or Firm* — Procopio, Cory, Hargreaves & Savitch LLP

(57) ABSTRACT

A storage system includes a first node mounting two controllers. The two controllers of the first node are subjected to setting of redundancy such that the two controllers belong to differing redundancy groups, respectively. When a configuration change is requested due to addition of a second node mounting one controller to the storage system, the second node sets the controller of the second node belongs to a redundancy group to which either of the two controllers of the first node belongs, and the first node changes the setting of redundancy such that setting information on the redundancy group of either of the two controllers of the first node does not change; and deactivates a controller of the first node for which the setting information on the redundancy group changes as a result of a change in the setting of redundancy.

12 Claims, 7 Drawing Sheets

| HARD ID | REDUNDANCY GROUP ID | SOFT ID | MOUNT FLAG |
|---|---|---|---|
| 0 | A | 0 | O |
| 1 | B | 6 | O |
| 2 | A | 1 | X |
| 3 | B | 7 | X |
| 4 | A | 2 | X |
| 5 | B | 8 | X |
| 6 | A | 3 | X |
| 7 | B | 9 | X |
| 8 | A | 4 | X |
| 9 | B | 10 | X |
| 10 | A | 5 | X |
| 11 | B | 11 | X |

METHOD FOR CHANGING CONFIGURATION OF STORAGE SYSTEM AND STORAGE SYSTEM

CLAIM OF PRIORITY

The present application claims priority from Japanese patent application JP 2021-77095 filed on Apr. 30, 2021, the content of which is hereby incorporated by reference into this application.

BACKGROUND OF THE INVENTION

The present invention relates to a method for changing the configuration of a storage system constituted of one or more nodes.

Storage systems having a plurality of nodes as the constituent elements thereof are well known. See WO/2018/179073, for example. Storage systems create data redundancy among the plurality of nodes in order to increase availability.

SUMMARY OF THE INVENTION

In a storage system including one node (hereinafter referred to as a "first type storage system"), two controllers are mounted on the node in order to create data redundancy, where each controller is set to configure differing redundancy groups. Meanwhile, in a storage system including a plurality of nodes (hereinafter referred to as a "second type storage system"), redundancy groups are configured for each node for data redundancy.

Switching from a first type storage system to a second type storage system presents the following problem.

As described above, the first type storage system and the second type storage system differ in terms of the method for managing redundancy. Therefore, simply adding nodes to a first type storage system would not result in a second type storage system. In order to operate as the second type storage system, it is necessary to change the redundancy settings for the data, and to perform tasks such as saving the data and the like. Thus, a transition from the first type storage system to the second type storage system would be expensive, and have a major impact on a user's work.

An object of the present invention is to provide a storage system for which the configuration can be changed and a control method for a storage system by which costs are kept low and impacts on the user's work are mitigated.

A representative example of the present invention disclosed in this specification is as follows: a method for changing a configuration of a storage system to be executed by the storage system, the storage system includes a first node mounted on two controllers, and a plurality of storage media. The two controllers of the first node are subjected to setting of redundancy such that the respective two controllers belong to differing redundancy groups. The method for changing a configuration of a storage system includes: a first step of setting, by a second node, in a case where a configuration change is required due to addition of the second node mounting at least one controller to the storage system, the at least one controller of the second node belongs to a redundancy group to which either of the two controllers of the first node belongs; a second step of changing, by the first node, the setting of redundancy such that setting information of the redundancy group of either of the two controllers of the first node does not change; and a third step of deactivating, by the first node, a controller of the first node for which the setting information of the redundancy group changes as a result of a change in the setting of redundancy.

According to the present invention, it is possible to change the configuration of the storage system while keeping costs low and mitigating impacts on the user's work. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein.

DETAILED DESCRIPTION OF EMBODIMENTS

Figure 1:
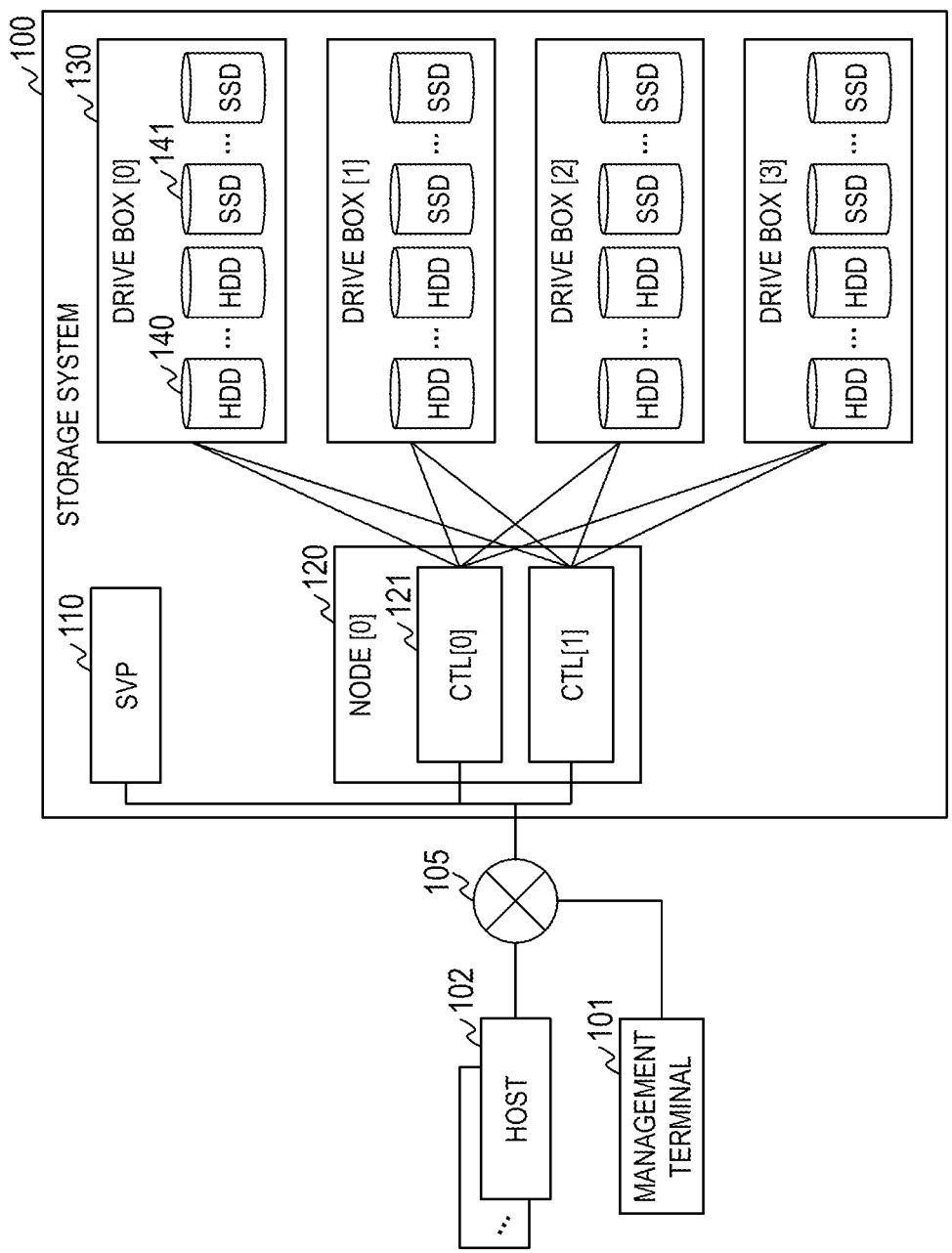
FIG. 1 shows a configuration example of a system of Embodiment 1.

Now, a description is given of an embodiment of this invention referring to the drawings. It should be noted that this invention is not to be construed by limiting the invention to the content described in the following embodiment. A person skilled in the art would easily recognize that a specific configuration described in the following embodiment may be changed within the scope of the concept and the gist of this invention.

In the following description, expressions of "table", "list", and "queue" are sometimes used as an example of information, but any kind of data structure of information may be used. In other words, in order to indicate that the information does not depend on the data structure, the "xx table" and the "xx list" may be paraphrased as "xxx information". When explaining the content of each information, expression such as "identification information", "identifier", "name", "ID", and "number" are used, but these can be replaced with each other.

In a configuration of this invention described below, the same or similar components or functions are assigned with the same reference numerals, and a redundant description thereof is omitted here.

Notations of, for example, "first", "second", and "third" herein are assigned to distinguish between components, and do not necessarily limit the number or order of those components.

The position, size, shape, range, and others of each component illustrated in, for example, the drawings may not represent the actual position, size, shape, range, and other metrics in order to facilitate understanding of this invention. Thus, this invention is not limited to the position, size, shape, range, and others described in, for example, the drawings.

Embodiment 1

Figures 2, 3A:
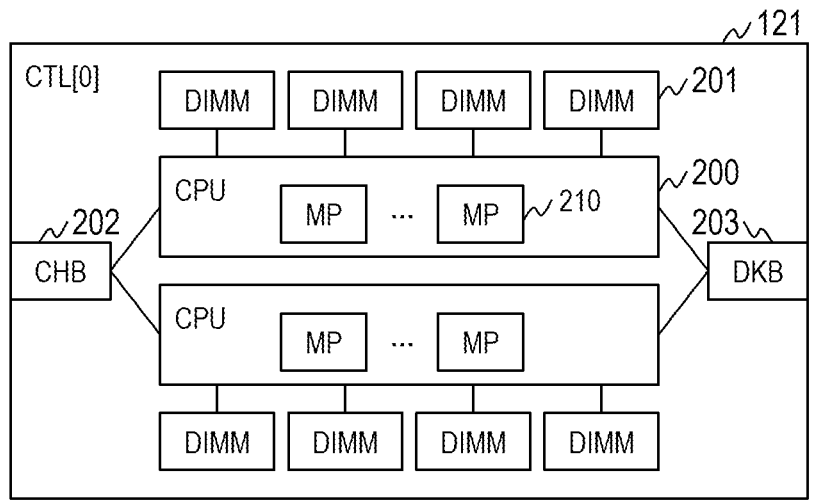
FIG. 2 shows an example of a hardware configuration of a controller according to Embodiment 1.
FIG. 3A shows an example of management information according to Embodiment 1.

FIG. 1 shows a configuration example of a system of Embodiment 1. FIG. 2 shows an example of a hardware configuration of a controller according to Embodiment 1.

The system of FIG. 1 includes a storage system 100, a management terminal 101, and a host 102. The management terminal 101 and the host 102 are coupled to the storage system 100 via a network 105. The network 105 is, for example, a wide area network (WAN), a local area network (LAN), a storage area network (SAN), or the like. The network 105 may be any one of a wired network and a wireless network. Also, the network between the management terminal 101 and the storage system 100 may differ from the network between the host 102 and the storage system 100.

The management terminal 101 is a computer for managing the storage system 100. An administrator of the storage system 100 uses the management terminal 101 in order to set and control the storage system 100.

The host 102 is a computer that uses the storage system 100. The host 102 writes user data to the storage system 100 and reads user data from the storage system 100.

The storage system 100 provides at least one volume for the host 102. The storage system 100 generates a redundant arrays of inexpensive disks (RAID) group from a plurality of storage media, and generates at least one volume from the RAID group. A volume is an LDEV, for example.

The storage system 100 includes an SVP 110, a node 120, and drive boxes 130. The SVP 110 and the node 120 are coupled to each other via an internal network constituted of switches and the like (not shown).

The SVP 110 monitors the entire storage system 100, and receives management commands and the like transmitted from the management terminal 101 to control the storage system 100. The SVP 110 has a CPU, a memory, a storage medium, and a network interface (not shown). The memory stores management information for managing the configuration or the like of the storage system 100, and programs that implement control functions of the storage system 100, or the like.

Each of the drive boxes 130 accommodates a plurality of storage media. Each storage medium is a hard disk drive (HDD) 140, a solid state drive (SSD) 141, or the like.

The node 120 controls the transmission and reception of user data between the host 102 and the storage media of the drive boxes 130, and controls the reading and writing of user data from/to the storage media. The node 120 has one or more storage controllers (CTLs) 121.

As shown in FIG. 2, a CTL 121 includes CPUs 200, memories 201, a channel board (CHB) 202, and a disk board (DKB) 203.

The CPU 200 has a plurality of processor cores (MP) 210. The memories 201 store programs that implement controls for user data, management information 300 and 310 to be described later, and the like. Also, the memories 201 include a cache memory for temporarily storing user data. The programs stored by the memories 201 are executed by the CPUs 200.

The CHB 202 is an interface that connects the host 102 to the storage system 100. The CHB 202 converts between the data transmission protocol between the host 102 and the CTL 121, and the data transmission protocol within the CTL 121, and the like.

The DKB 203 is an interface that connects the CTLs 121 to the drive boxes 130. The DKB 203 converts between the data transmission protocol within the CTL 121 and the data transmission protocol between the CTL 121 and the drive box 130, and the like.

In FIG. 1, the node 120 and the SVP 110 are separate components, but alternatively, the node 120 may include the SVP 110.

In the description below, if it is necessary to distinguish between the nodes 120 and the CTLs 121, "node(i) 120" and "CTL(i) 121" are used. The index "i" is an integer of 0 or greater.

The storage system 100 of FIG. 1 includes one node(0) 120, and thus, is a first type storage system. In this case, the storage system 100 is set such that the CTL(0) 121 and the CTL(1) 121 belong to different redundancy groups. As a result, the storage system 100 can avoid data loss even if a fault were to occur in one CTL 121, and can continue operating.

Figure 3B:
FIG. 3B shows an example of management information according to Embodiment 1.

FIG. 3A shows an example of the management information 300 according to Embodiment 1. FIG. 3B shows an example of the management information 310 according to Embodiment 1. The two pieces of management information 300 and 310 are stored in the memory 201 of the CTL 121.

The management information 300 is defined therein redundancy settings of the first type storage system. The management information 300 stores entries including a hard ID 301, a redundancy group ID 302, a soft ID 303, and a mount flag 304. Each entry corresponds to setting information on a redundancy group of one CTL 121.

The hard ID 301 is a field that stores identification information for identifying the CTLs 121 of the storage system 100.

The redundancy group ID 302 is a field that stores identification information on a redundancy group.

The soft ID 303 is a field that stores identification information for identifying the cache memory of the storage system 100.

The mount flag 304 is a field that stores a flag indicating the presence or absence of the CTL 121 in the storage system 100. The mount flag 304 stores therein a circle indicating that the CTL 121 is mounted or an "X" indicating that the CTL 121 is not mounted.

The first type storage system includes one node 120 mounting two CTLs 121, and thus, the mount flag 304 has stored therein an "X" for all entries with hard IDs 301 from "2" to "11." Also, each of the two CTLs 121 is set therein a different redundancy group. Thus, in the first type storage system, a redundancy group is configured in the CTL 121 units.

The management information 310 is defined therein redundancy settings of the second type storage system. The management information 310 stores entries including a hard ID 311, a redundancy group ID 312, a soft ID 313, and a mount flag 314. Each entry corresponds to setting information on a redundancy group of one CTL 121.

The hard ID 311, the redundancy group ID 312, the soft ID 313, and the mount flag 314 are the same fields as the hard ID 301, the redundancy group ID 302, the soft ID 303, and the mount flag 304.

However, the mount flag 314 includes an array for each configuration. Specifically, these are a storage system 100 including two nodes 120 each having one CTL 121 mounted thereto (2 node-2 CTL configuration), a storage system 100 including two nodes 120 each having two CTLs 121 mounted thereto (2 node-4 CTL configuration), a storage system 100 including four nodes 120 each having two CTLs 121 mounted thereto (4 node-8 CTL configuration), and a storage system 100 including six nodes 120 each having two CTLs 121 mounted thereto (6 node-12 CTL configuration).

The CTLs 121 of the nodes 120 of the second type storage system are set such that all belong to the same redundancy group. Thus, in the second type storage system, a redundancy group is configured in the node 120 units.

Next, a method for changing from the first type storage system to the second type storage system will be described.

Figure 4:
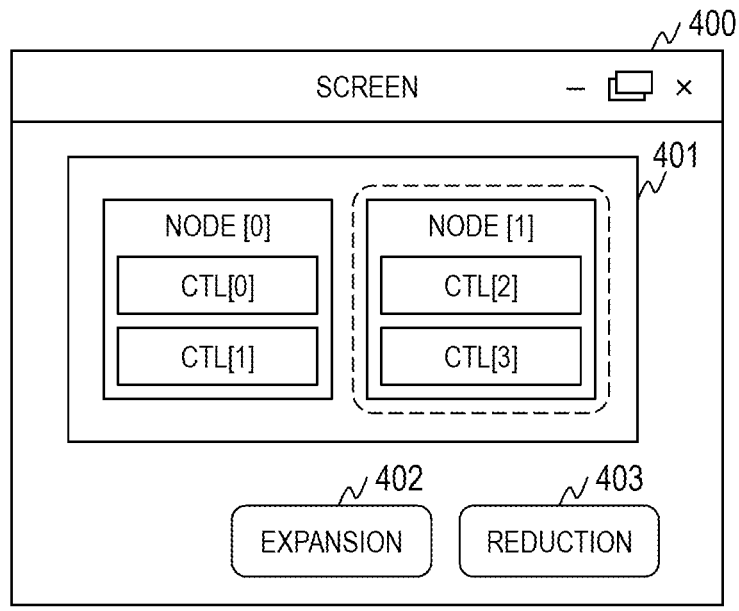
FIG. 4 shows an example of a screen displayed in a management terminal of Embodiment 1.

FIG. 4 shows an example of a screen displayed in the management terminal 101 of Embodiment 1.

A screen 400 includes a configuration display box 401, an expansion button 402, and a reduction button 403.

The configuration display box 401 is a box that displays the hardware configuration of the storage system 100. The configuration display box 401 displays the nodes 120 included in the storage system 100, the CTLs 121 mounted in the nodes 120, and the like. The configuration display box 401 may display the drive boxes 130 and the like.

The expansion button 402 is an operation button for switching to a configuration in which the node 120 and/or the CTL 121 is added. The reduction button 403 is an operation button for switching to a configuration in which the node 120 and/or the CTL 121 is removed.

The configuration of the storage system 100 of the present embodiment is changed in stages. That is, the first type storage system is scaled out to the second type storage system with a 2 node-2 CTL configuration, the second type storage system with the 2 node-2 CTL configuration is scaled out to the second type storage system with the 2 node-4 CTL configuration, the second type storage system with the 2 node-4 CTL configuration is scaled out to the second type storage system with the 4 node-8 CTL configuration, and the second type storage system with the 4 node-8 CTL configuration is scaled out to the second type storage system with the 6 node-12 CTL configuration. This similarly applies to scaling in.

In the case of a configuration change process resulting from an expansion in nodes 120, prior to the start of the process, an administrator or the like physically connects a node 120 or a CTL 121 to the storage system 100.

Figure 5:
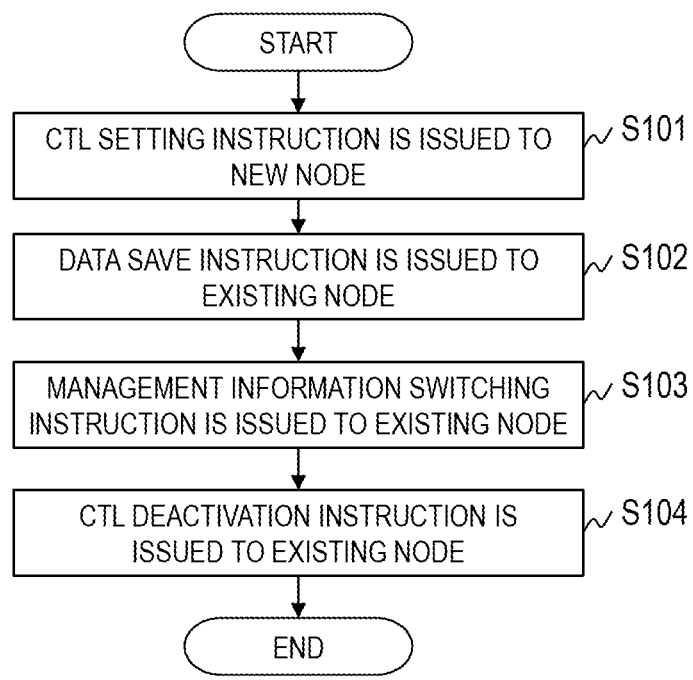
FIG. 5 is a flowchart describing one example of a configuration change process (scale out) executed by a storage system of Embodiment 1.
Figure 6:
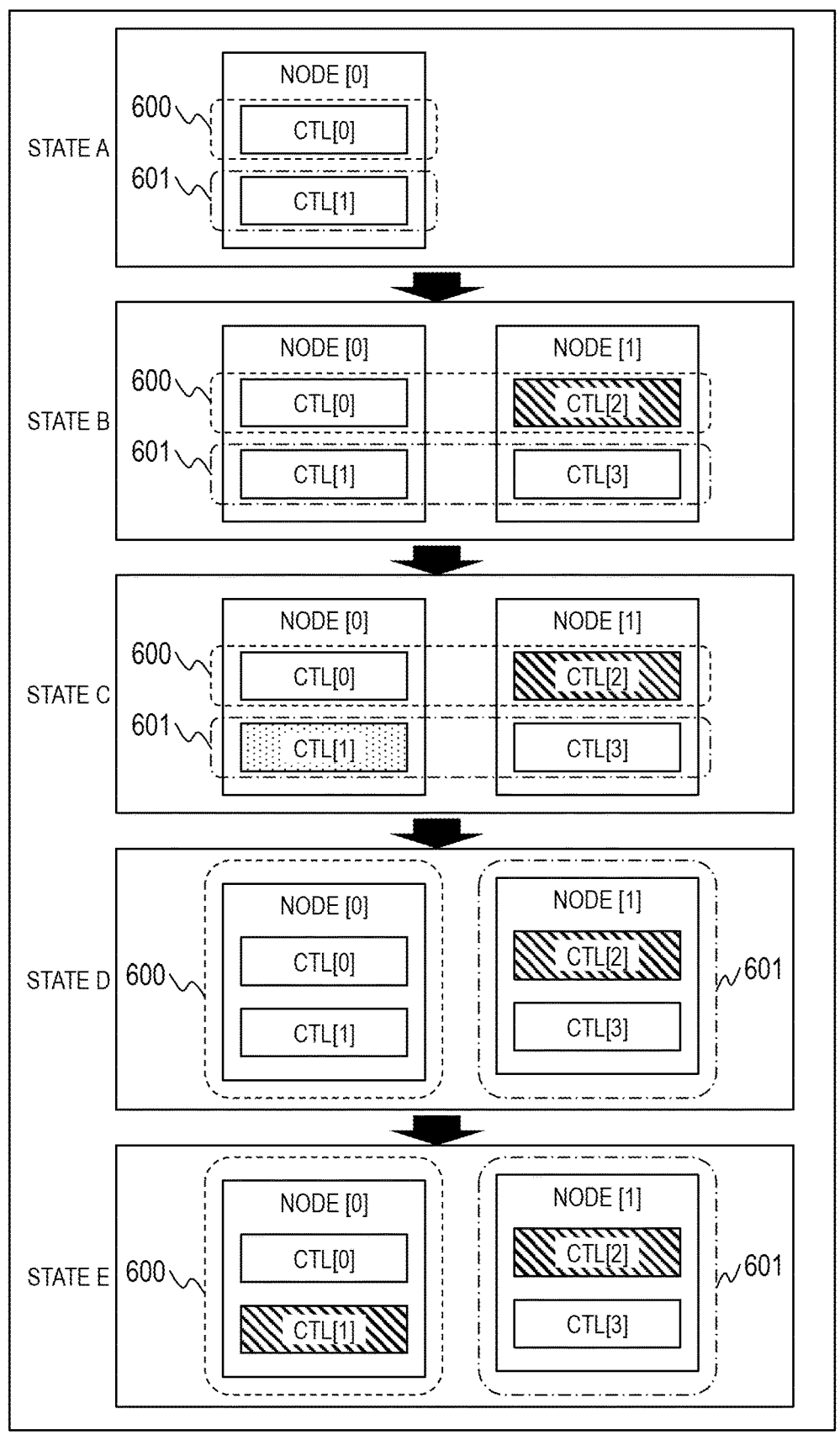
FIG. 6 shows an example of state transitions in the storage system of Embodiment 1.
Figure 7:
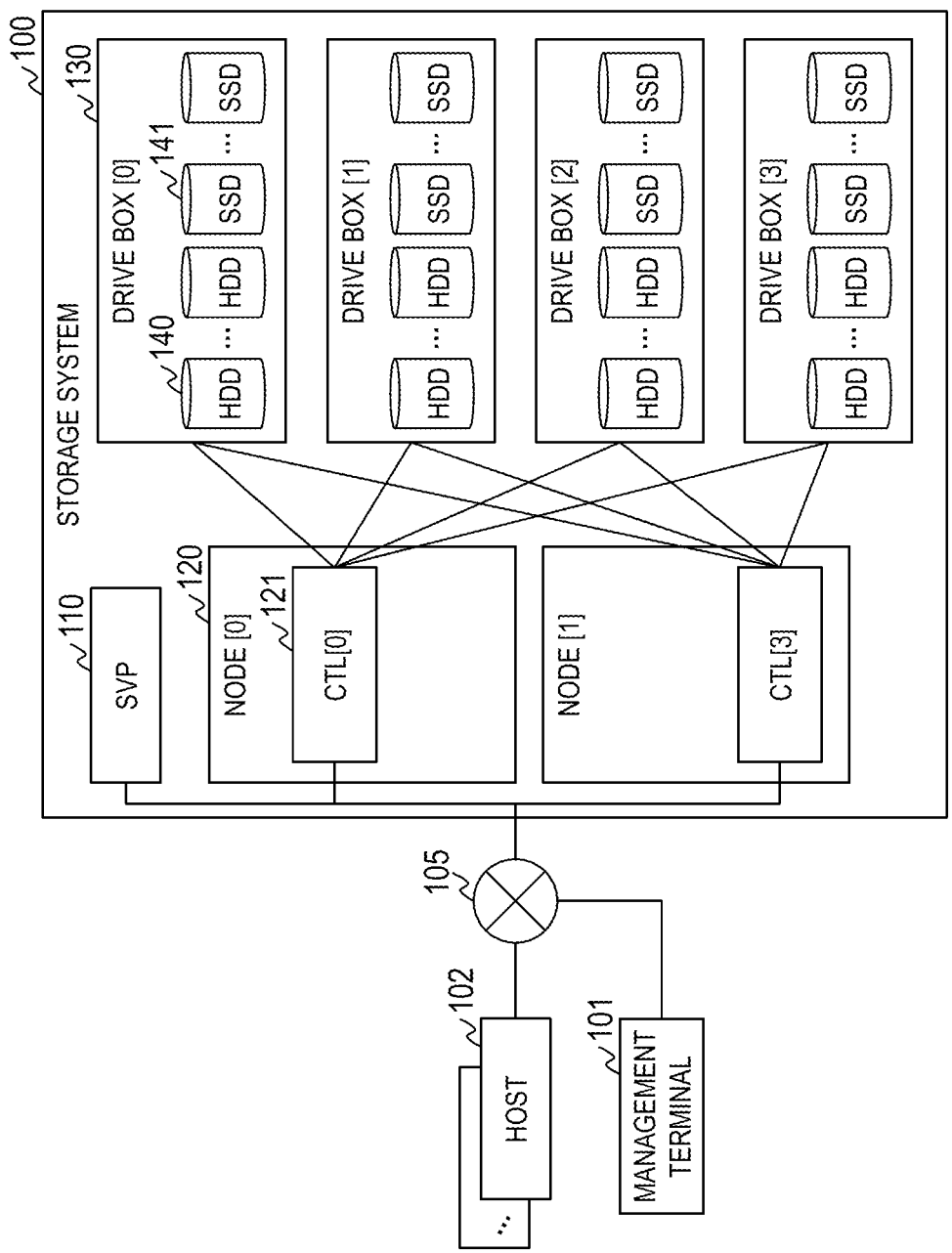
FIG. 7 shows an example of a configuration after the configuration change process (scale out) executed by the storage system of Embodiment 1.

The configuration change process involving an expansion in nodes 120 will be described with reference to FIGS. 5 to 9. FIG. 5 is a flowchart describing one example of a configuration change process (scale out) executed by the storage system 100 of Embodiment 1. FIG. 6 shows an example of state transitions in the storage system 100 of Embodiment 1. FIG. 7 shows an example of a configuration after the configuration change process (scale out) executed by the storage system 100 of Embodiment 1.

The SVP 110 of the storage system 100 executes a configuration change process (scale out) upon receiving an operation of the expansion button 402 from the management terminal 101. The configuration change process (scale out) for changing from the first type storage system to the second type storage system with 2 node-2 CTL configuration will be described with reference to FIG. 5. A publicly known technique can be used for scaling out from the 2 node-2 CTL configuration onward, and thus, description thereof will be omitted.

In the present embodiment, the first type storage system as indicated in the state A of FIG. 6 will be described as an example. The CTL(0) 121 of the node(0) 120 belongs to the redundancy group 600, and the CTL(1) 121 belongs to the redundancy group 601.

In a case of changing from the first type storage system to the second type storage system with 2 node-2 CTL configuration, the administrator adds a new node 120 to the storage system 100. At least one CTL 121 is mounted on the new node 120. In a case where two CTLs 121 are mounted on the new node 120, then one of the CTLs 121 is deactivated.

In the present embodiment, as indicated in the state B of FIG. 6, a node(1) 120 mounting the CTL(3) 121 is added.

The SVP 110 issues a redundancy setting instruction for the second type storage system to the new node 120 (step S101).

Upon receiving the instruction, the CTL 121 of the new node 120 reads the management information 310 stored in the memory 201, and performs settings such that the CTL 121 belongs to a redundancy group to which either of two CTLs 121 of an existing node 120 belongs.

The redundancy group IDs 302 and 312 and the soft IDs 303 and 313 have the same value for the entry where the hard ID 301 of the management information 300 is "3" and the entry where the hard ID 311 of the management information 310 is "3." That is, even when changing from the first type storage system to the second type storage system, the setting information on the redundancy group does not change. At this point, the administrator performs a setting such that the hard ID 311 of "3" is activated. The CTL 121 of the new node 120 is set to belong to a redundancy group corresponding to the redundancy group ID 312 of the entry.

In the present embodiment, as indicated in state B of FIG. 6, the CTL(3) 121 is set to belong to the same redundancy group 601 as the CTL(1) 121.

Next, the SVP 110 instructs the existing node 120 to save the user data stored in the cache memory (step S102).

The CTL 121 of the existing node 120 identifies a target CTL 121 to which to save data upon receiving the instruction. Specifically, the CTL 121 of the existing node 120 refers to the management information 300 and 310, and searches for an entry in which the setting information on the redundancy group has not changed even if changing from the first type storage system to the second type storage system. The CTL 121 sets the CTL(1) 121 belonging to a redundancy group that is different from the redundancy group of the entry as the target CTL 121, and instructs the target CTL 121 to execute the data save process. The target CTL 121 executes the data save process, and upon completion of the data save process, notifies the SVP 110 of completion of the data save process.

In the present embodiment, as indicated in the state C of FIG. 6, the CTL(1) 121 of the node(0) 120 saves the data stored in the cache memory as the target CTL 121.

Upon completion of the data save process, the SVP 110 instructs the existing node 120 to switch from the management information 300 to the management information 310 (step S103). That is, the instruction is to change the redundancy setting.

A CTL 121 differing from the target CTL 121 of the existing node 120 switches from the management information 300 to the management information 310. By the management information 300 being switched to the management information 310, the redundancy setting is switched from the CTL 121 units to the node 120 units. In the present embodiment, as indicated in the state D of FIG. 6, the node(0) 120 belongs to the redundancy group 600 and the node(1) 120 belongs to the redundancy group 601.

Next, the SVP 110 instructs the existing node 120 to deactivate the CTL 121 (step S104) and ends the process.

The CTL 121 differing from the target CTL 121 of the existing node 120 deactivates the target CTL 121.

In the present embodiment, as indicated in the state E of FIG. 6, the CTL(0) 121 deactivates the CTL(1) 121 which is the target CTL 121.

The SVP 110 may display, in the management terminal 101, a message requesting the removal of the deactivated CTL 121. Also, the SVP 110 may display, in the management terminal 101, a notification indicating completion of expansion of the nodes 120.

As a result of the above processes, the storage system 100 shown in FIG. 1 is changed to the configuration shown in FIG. 7.

In the present embodiment, only the CTL 121 having the same setting information on the redundancy group in the first type storage system and the second type storage system is left remaining in the existing node 120. As a result, even if switching from the management information 300 to the management information 310, the setting information on the redundancy group does not change for the CTL 121 of the existing node 120. Thus, it is possible to change from the first type storage system to the second type storage system with a 2 node-2 CTL configuration without stopping the storage system 100.

Figure 8:
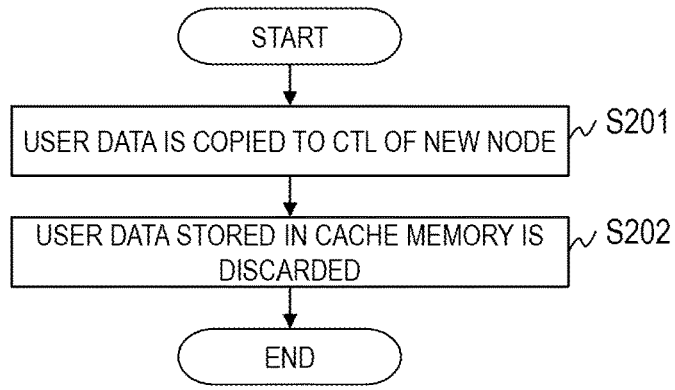
FIGS. 8 and 9 are flowcharts describing one example of a data save process executed by a CTL of Embodiment 1.
Figure 9:
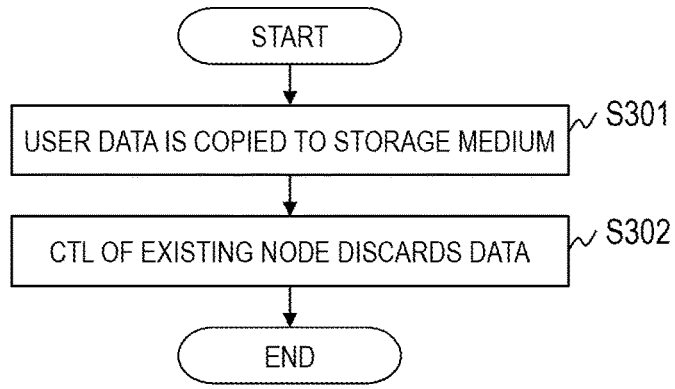

FIGS. 8 and 9 are flowcharts describing one example of a data save process executed by the CTL 121 of Embodiment 1.

First, the data save process of FIG. 8 will be described.

The target CTL 121 of the existing node 120 copies the user data stored in the cache memory to the new node 120 (step S201). The CTL 121 of the new node 120 writes the user data received from the existing node 120 to the cache memory.

After completion of copying all user data stored in the cache memory, the target CTL 121 of the existing node 120 discards all user data stored in the cache memory (step S202) and ends the process.

After receiving an instruction to save data, the target CTL 121 of the existing node 120 executes control such that user data is not written to the cache memory.

Next, the data save process of FIG. 9 will be described.

The target CTL 121 of the existing node 120 copies the user data stored in the cache memory to a storage medium of the drive box 130 (step S301).

After completion of copying all user data stored in the cache memory, the target CTL 121 of the existing node 120 discards all user data stored in the cache memory (step S302) and ends the process.

After receiving an instruction to save data, the target CTL 121 of the existing node 120 executes control such that user data is not written to the cache memory.

The target CTL 121 of the existing node 120 may combine the data save processes of FIGS. 8 and 9. The target CTL 121 of the existing node 120 copies user data with a high access frequency to a new CTL 121, and copies user data with a low access frequency to the storage medium, for example.

Figure 10:
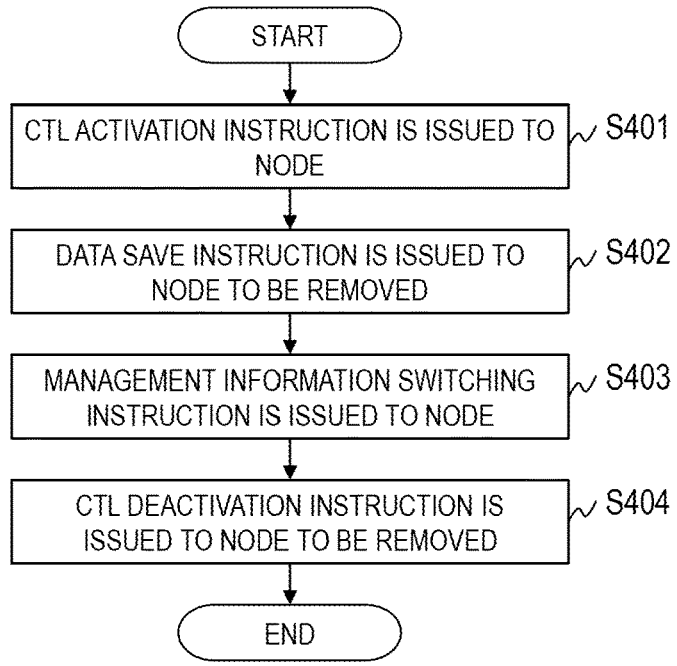
FIG. 10 is a flowchart describing one example of a configuration change process (scale in) executed by the storage system of Embodiment 1.

The configuration change process involving a reduction in nodes 120 will be described with reference to FIG. 10. FIG. 10 is a flowchart describing one example of a configuration change process (scale in) executed by the storage system 100 of Embodiment 1.

The SVP 110 of the storage system 100 executes a configuration change process (scale in) upon receiving an operation of the reduction button 403 from the management terminal 101. The configuration change process (scale in) for converting from the 2 node-2 CTL configuration second type storage system to the first type storage system will be described with reference to FIG. 10. A publicly known technique can be used for scaling in from the 6 node-12 CTL configuration to the 2 node-2 CTL configuration, and thus, description thereof will be omitted.

The SVP 110 instructs any of the nodes 120 to activate the CTL 121 (step S401).

In the present embodiment, the SVP 110 instructs the node(0) 120 to activate the CTL 121. The node(0) 120 activates the CTL(1) 121. At this time, the CTL(1) 121 is controlled such that user data from the host 102 is not written.

Next, the SVP 110 instructs the node 120 that is to be removed, for which the CTL 121 was not activated, to save the user data stored in the cache memory (step S402).

In the present embodiment, the node(1) 120 is the node 120 to be removed. The node(1) 120 executes the data save process, and upon completion of the data save process, notifies the SVP 110 of completion of the data save process. The data save process is the same as the processes described in FIGS. 8 and 9.

Upon completion of the data save process, the SVP 110 instructs the node 120 that activated the CTL 121 to switch from the management information 310 to the management information 300 (step S403).

The existing CTL 121 of the node 120 that activated the CTL 121 switches from the management information 310 to the management information 300. The activated CTL 121 reads the management information 300. By the management information 310 being switched to the management information 300, the redundancy setting is switched from the node 120 units to the CTL 121 units. In the present embodiment, the redundancy setting is switched from the state D to the state B of FIG. 6.

Next, the SVP 110 instructs the node 120 that is to be removed to deactivate the CTL 121 (step S404) and ends the process. Upon receiving that instruction, the CTL 121 of the node 120 to be removed deactivates the CTL 121 for which the redundancy group setting was made.

The SVP 110 may display, in the management terminal 101, a message requesting the removal of the node 120 to be removed. Also, the SVP 110 may display, in the management terminal 101, a notification indicating completion of reduction of the nodes 120.

In the present embodiment, the setting information on the redundancy group of the CTL 121 that was operating prior to reduction is not changed. Thus, it is possible to change from the 2 node-2 CTL configuration second type storage system to the first type storage system without stopping the storage system 100.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A method for changing a configuration of a storage system to be executed by the storage system,
   the storage system including a first node mounted on two controllers, and a plurality of storage media,
   the two controllers of the first node being subjected to setting of redundancy such that the two controllers belong to differing redundancy groups, respectively, and
   the method for changing the configuration of the storage system including:
   a first step of setting, by a second node, in a case where a configuration change is requested due to addition of the second node mounting at least one other controller to the storage system, the at least one other controller of the second node belongs to a redundancy group to which either of the two controllers of the first node belongs;
   a second step of changing, by the first node, the setting of redundancy such that setting information on the redundancy group of either of the two controllers of the first node does not change; and
   a third step of deactivating, by the first node, a controller of the two controllers of the first node for which the setting information on the redundancy group changes as a result of a change in the setting of redundancy,
   wherein the controller of the two controllers of the first node holds first management information for setting redundancy using one node, and second management information for setting redundancy using two or more of nodes,
   wherein the first management information and the second management information include the setting information on the redundancy group to be set to the controller of the two controllers of the first node mounted on the first node, and
   wherein the first step includes a step of referring, the at least one other controller of the second node, to the first management information and the second management information to determine the redundancy group to which the at least one other controller belongs on a basis of a same setting information on the redundancy group in the first management information and the second management information.

2. The method for changing a configuration of a storage system according to claim 1,
   wherein the second step includes a step of switching, by the controller of the two controllers of the first node in which the setting information on the redundancy group is the same in the first management information and the second management information, from the first management information to the second management information.

3. The method for changing a configuration of a storage system according to claim 1,
   wherein the second step includes a fourth step of saving, by the controller of the two controllers of the first node in which the setting information on the redundancy group differs between the first management information and the second management information, data stored in a cache memory of the controller of the two controllers of the first node before switching from the first management information to the second management information.

4. The method for changing a configuration of a storage system according to claim 3,
   wherein the fourth step includes a step of writing, the controller of the two controllers of the first node in which the setting information on the redundancy group differs between the first management information and the second management information, the data stored in the cache memory of the controller of the two controllers of the first node to the at least one other controller of the second node for which the redundancy group is set.

5. The method for changing a configuration of a storage system according to claim 3,
   wherein the fourth step includes a step of writing, the controller of the two controllers of the first node in which the setting information on the redundancy group differs between the first management information and the second management information, the data stored in the cache memory of the controller of the two controllers of the first node to the plurality of storage media.

6. The method for changing a configuration of a storage system according to claim 2, further including:
   a step of activating, in a case where the configuration change is requested that involves removing the second node from the storage system, by the controller of the two controllers of the first node activated, the deactivated controller of the first node;
   a step of saving, by the at least one other controller of the second node for which the redundancy group is set, data stored in a cache memory of the at least one other controller;
   a step of switching, by the controller of the two controllers of the first node activated before being requested the removing of the second node, from the second management information to the first management information; and
   a step of deactivating, by the at least one other controller of the second node, the at least one other controller for which the redundancy group is set.

7. A storage system comprising:
a first node mounting two controllers; and
a plurality of storage media,
the two controllers of the first node being subjected to setting of redundancy such that the two controllers belong to differing redundancy groups, respectively,
in a case where a configuration change is requested due to addition of a second node mounting at least one of other controller to the storage system,
the second node being configured to execute a first process of setting the at least one other controller of the second node belongs to a redundancy group to which either of the two controllers of the first node belongs, and
the first node being configured to:
execute a second process of changing the setting of redundancy such that setting information on the redundancy group of either of the two controllers of the first node does not change; and
execute a third process of deactivating a controller of the two controllers of the first node for which the setting information on the redundancy group changes as a result of a change in the setting of redundancy,
wherein the controller of the two controllers of the first node holds first management information for setting the redundancy using one node, and second management information for setting the redundancy using two or more nodes,
wherein the first management information and the second management information include the setting information on the redundancy group to be set to the controller of the two controllers of the first node mounted on the first node, and
wherein, in the first process, the at least one other controller of the second node refers to the first management information and the second management information to determine the redundancy group to which the other controller belongs on a basis of a same setting information on the redundancy group in the first management information and the second management information.

8. The storage system according to claim 7,
wherein, in the second process, the controller of the two controllers of the first node, in which the setting information on the redundancy group is the same in the first management information and the second management information, switches from the first management information to the second management information.

9. The storage system according to claim 7,
wherein the second process executes a fourth process in which the controller of the two controllers of the first node, in which the setting information on the redundancy group differs between the first management information and the second management information, saves data stored in a cache memory of the controller of the two controllers of the first node before switching from the first management information to the second management information.

10. The storage system according to claim 9,
wherein, in the fourth process, the controller of the two controllers of the first node, in which the setting information on the redundancy group differs between the first management information and the second management information, writes the data stored in the cache memory of the controller of the two controllers of the first node to the at least one other controller of the second node for which the redundancy group is set.

11. The storage system according to claim 9,
wherein, in the fourth process, the controller of the two controllers of the first node, in which the setting information on the redundancy group differs between the first management information and the second management information, writes the data stored in the cache memory of the controller of the two controllers of the first node to the plurality of storage media.

12. The storage system according to claim 8,
wherein, in a case where the configuration change is requested that involves removing the second node from the storage system, following processes are executed:
a process in which the controller of the two controllers of the first node activated before being requested removing of the second node activates the deactivated controller of the first node;
a process in which the at least one other controller of the second node, for which set the redundancy group is set, saves data stored in a cache memory of the at least one other controller;
a process in which the controller of the two controllers of the first node activated before being requested the removing of the second node switches from the second management information to the first management information; and
a process in which the at least one other controller of the second node deactivates the at least one other controller for which the redundancy group is set.

* * * * *